United States Patent
Park et al.

(10) Patent No.: US 11,026,094 B2
(45) Date of Patent: Jun. 1, 2021

(54) METHOD AND SYSTEM FOR CONTROLLING UICC AND EUICC

(71) Applicant: Samsung Electronics Co., Ltd., Suwon-si (KR)

(72) Inventors: Jung Sik Park, Suwon-si (KR); Sang Hwi Lee, Suwon-si (KR); Do Hun Cha, Yongin-si (KR); Sun Min Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/331,050

(22) PCT Filed: Sep. 11, 2017

(86) PCT No.: PCT/KR2017/009961
§ 371 (c)(1),
(2) Date: Mar. 6, 2019

(87) PCT Pub. No.: WO2018/048278
PCT Pub. Date: Mar. 15, 2018

(65) Prior Publication Data
US 2019/0208405 A1    Jul. 4, 2019

(30) Foreign Application Priority Data
Sep. 9, 2016 (KR) .................... 10-2016-0116428

(51) Int. Cl.
*H04W 8/20* (2009.01)
*H04W 88/02* (2009.01)
(Continued)

(52) U.S. Cl.
CPC .......... *H04W 12/45* (2021.01); *H04L 63/0876* (2013.01); *H04W 8/18* (2013.01);
(Continued)

(58) Field of Classification Search
CPC .......... H04L 63/0876; H04L 29/12905; H04L 61/6054; H04W 4/60; H04W 12/45; H04W 12/43
See application file for complete search history.

(56) References Cited

U.S. PATENT DOCUMENTS 8,965,366 B1 * 2/2015 Somayajula .......... H04W 60/00
370/328
9,037,193 B2   5/2015 Vergnes et al.
(Continued)

FOREIGN PATENT DOCUMENTS

EP   2 461 613 A1   6/2012
EP   2 963 955 A1   1/2016
(Continued)

OTHER PUBLICATIONS

Extended European Search Report dated Jun. 7, 2019, issued in European Patent Application No. 17849162.7.

Primary Examiner — Omer S Mian
(74) Attorney, Agent, or Firm — Jefferson IP Law, LLP

(57) ABSTRACT

An electronic device is provided. The electronic device includes a UICC in which a first profile is installed, an eUICC, and a processor electrically connected with the UICC and the eUICC. The processor requests a second profile to be installed in the eUICC from a first server based on the first profile, receives the second profile from a second server associated with the first server, and installs the received second profile in the eUICC. The second profile and the first profile include the same subscriber identification information.

12 Claims, 9 Drawing Sheets

(51) Int. Cl.
- *H04W 8/18* (2009.01)
- *H04W 88/18* (2009.01)
- *H04W 12/069* (2021.01)
- *H04L 29/06* (2006.01)
- *H04W 8/26* (2009.01)
- *H04W 12/45* (2021.01)

(52) U.S. Cl.
CPC ............ *H04W 8/183* (2013.01); *H04W 8/20* (2013.01); *H04W 8/205* (2013.01); *H04W 8/265* (2013.01); *H04W 12/069* (2021.01); *H04W 88/02* (2013.01); *H04W 88/18* (2013.01)

(56) References Cited

U.S. PATENT DOCUMENTS

| | | | |
|---|---|---|---|
| 9,232,392 B2 | 1/2016 | Lee et al. | |
| 9,294,919 B2 | 3/2016 | Merrien et al. | |
| 9,301,145 B2 | 3/2016 | Merrien et al. | |
| 9,326,146 B2 | 4/2016 | Bradley | |
| 9,451,098 B2 | 9/2016 | Zhu et al. | |
| 9,462,475 B2 | 10/2016 | Merrien et al. | |
| 9,532,223 B2 | 12/2016 | Girard et al. | |
| 9,549,313 B2 | 1/2017 | Park et al. | |
| 9,690,950 B2 | 6/2017 | Vergnes et al. | |
| 9,760,726 B2 | 9/2017 | Berard et al. | |
| 9,788,190 B2 | 10/2017 | Park et al. | |
| 9,800,993 B2 | 10/2017 | Lee et al. | |
| 9,817,993 B2 | 11/2017 | Merrien et al. | |
| 9,946,888 B2 | 4/2018 | Proust et al. | |
| 10,064,047 B2 | 8/2018 | Park et al. | |
| 2003/0148791 A1 * | 8/2003 | Ahn ..................... | H04W 8/183 455/559 |
| 2012/0190354 A1 | 7/2012 | Merrien et al. | |
| 2013/0318355 A1 | 11/2013 | Girard et al. | |
| 2013/0324091 A1 | 12/2013 | Girard et al. | |
| 2013/0329683 A1 | 12/2013 | Berard et al. | |
| 2014/0024343 A1 | 1/2014 | Bradley | |
| 2014/0031083 A1 | 1/2014 | Vergnes et al. | |
| 2014/0057680 A1 | 2/2014 | Proust | |
| 2014/0122872 A1 | 5/2014 | Merrien et al. | |
| 2014/0141747 A1 | 5/2014 | Merrien et al. | |
| 2014/0357229 A1 | 12/2014 | Lee et al. | |
| 2015/0038193 A1 | 2/2015 | Vergnes et al. | |
| 2015/0134958 A1 | 5/2015 | Merrien et al. | |
| 2015/0304506 A1 | 10/2015 | Zhu et al. | |
| 2015/0382178 A1 | 12/2015 | Park et al. | |
| 2016/0006728 A1 | 1/2016 | Park et al. | |
| 2016/0050557 A1 | 2/2016 | Park et al. | |
| 2016/0072562 A1 | 3/2016 | Onggosanusi et al. | |
| 2016/0134991 A1 | 5/2016 | Lee et al. | |
| 2016/0379006 A1 | 12/2016 | Merrien et al. | |
| 2017/0134932 A1 | 5/2017 | Park et al. | |
| 2017/0156051 A1 | 6/2017 | Park et al. | |
| 2018/0020342 A1 | 1/2018 | Park et al. | |
| 2018/0063698 A1 * | 3/2018 | Sonntag ............... | H04L 67/303 |
| 2018/0367984 A1 | 12/2018 | Park et al. | |
| 2019/0053040 A1 * | 2/2019 | Long ..................... | H04W 8/183 |
| 2019/0141518 A1 * | 5/2019 | Lin ....................... | H04W 8/245 |
| 2019/0268757 A1 * | 8/2019 | Yi ......................... | H04W 76/10 |
| 2019/0313241 A1 * | 10/2019 | Ahmed .............. | H04W 12/0609 |
| 2019/0327605 A1 * | 10/2019 | Fan ....................... | H04W 12/06 |
| 2020/0154305 A1 * | 5/2020 | Link, II ............... | H04L 47/2441 |

FOREIGN PATENT DOCUMENTS

| | | |
|---|---|---|
| EP | 2 986 044 A1 | 2/2016 |
| KR | 10-2014-0140882 A | 12/2014 |
| KR | 10-2016-0002211 A | 1/2016 |
| KR | 10-2016-0002326 A | 1/2016 |
| KR | 10-2016-0020816 A | 2/2016 |
| KR | 10-2016-0030457 A | 3/2016 |

* cited by examiner

METHOD AND SYSTEM FOR CONTROLLING UICC AND EUICC

TECHNICAL FIELD

The disclosure relates to technologies of controlling an eUICC based on a UICC.

BACKGROUND ART

According to the related art, when a user wants to replace his or her terminal while maintaining user information such as telephone numbers, he or she may separate a subscriber identification module (SIM) card from the old terminal and may insert the SIM card into a new terminal, thus maintaining old telephone numbers or the like in the new terminal.

Meanwhile, as electronic devices (e.g., smartphones) have been miniaturized and as functions, modules, sensors, or the like loaded into the electronic devices have been increased, SIM cards have become smaller in size. Recently, electronic devices, each of which includes an embedded SIM (eSIM), have been released to the market.

Furthermore, a plurality of SIMs may be mounted on any electronic device. For example, each of a plurality of user terminals which are released in China may mount two or more SIM cards. Moreover, a user terminal having an eSIM may enable two or more profiles. Furthermore, any electronic device may have a SIM card (i.e., a physical SIM) and an eSIM (i.e., a soft SIM) together.

DISCLOSURE

Technical Problem

When a user terminal has a SIM card and an eSIM, that is, a physical SIM and a soft SIM, together, a user may want to use the eSIM rather than the SIM card. Alternatively, when a user who has used a terminal supporting a SIM card replaces his or her user terminal with a terminal supporting an eSIM, he or she may want the same service or use environment as the terminal supporting the SIM card in the terminal supporting the eSIM. For example, the user may want to change the SIM card to the eSIM while using the same telephone number as that being registered with the SIM card. However, at present, a solution associated with this is not provided.

An aspect of the disclosure is to provide a method and system for addressing the above-mentioned problems and/or purposes disclosed in the disclosure.

Technical Solution

In accordance with an aspect of the disclosure, an electronic device is provided. The electronic device may include a UICC in which a first profile is installed, an eUICC, and a processor configured to be electrically connected with the UICC and the eUICC. The processor may be configured to request a second profile to be installed in the eUICC from a first server based on the first profile, receive the second profile from a second server associated with the first server, and install the received second profile in the eUICC. The second profile and the first profile may include the same subscriber identification information.

In accordance with another aspect of the disclosure, a method for managing a profile in an electronic device having a UICC and an eUICC is provided. The method may include requesting a second profile to be installed in the eUICC from a first server based on a first profile installed in the UICC and receiving the second profile including the same subscriber identification information as the first profile from a second server associated with the first server.

In accordance with another aspect of the disclosure, a profile management server is provided. The profile management server may include a communication circuit configured to receive an activation code request from an MNO server and a control circuit configured to generate an activation code and a profile. The server may be configured to transmit the activation code to the MNO server in response to the activation code request, authenticate a terminal based on the activation code, and transmit the profile to the terminal.

Advantageous Effects

According to embodiments disclosed in the disclosure, a user may replace a physical SIM (e.g., a UICC) with a soft SIM (e.g., an eUICC) in a state where he or she maintains an old phone number.

In addition, various effects directly or indirectly ascertained through the disclosure may be provided.

MODE FOR INVENTION

Figure 1:
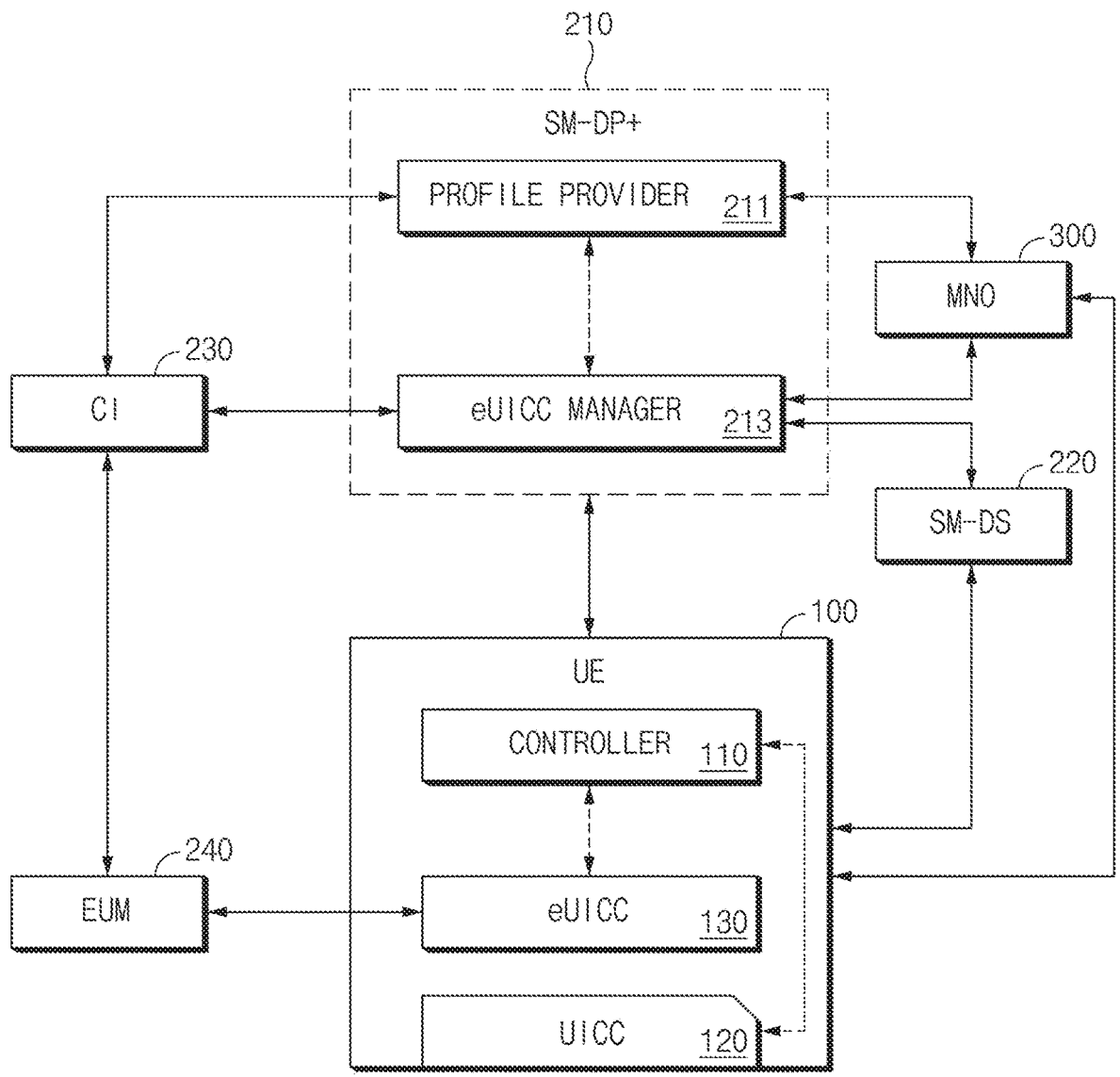
FIG. 1 illustrates a network environment for managing a UICC and an eUICC according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

The following is a list of important acronyms used in the disclosure. Acronyms which are not defined below may be defined when first used in the disclosure. For some acronyms which are obvious to those skilled in the art, their definitions will be omitted.

BSS: Business-Support-System
CA: Certificate Authority
CI: Certificate Issuer
EID: eUICC identification
EUM: eUICC Manufacturer system
eSE: embedded secure element
eSIM: embedded SIM
eUICC: embedded UICC
ICCID: Integrated Circuit Card Identifier
IMEI: International Mobile Equipment Identity
IMSI: International Mobile Subscriber Identity
ISIM: Internet protocol multimedia SIM LPA: local profile assistant
MCC: Mobile Country Code
MNC: Mobile Network Code
MNO: Mobile Network Operator
MSISDN: Mobile Station International Subscriber Directory Number
MVNO: Mobile Virtual Network Operator
OTA: Over-The-Air
SIM: Subscriber Identification Module
SM-DP+: Subscription Manager-Data Preparation+ (or advanced SM-DP)
SM-DS: Subscription Manager-Discovery Service
SM-SR: Subscription Manager-Secure Routing
UICC: Universal Integrated Circuit Card
USIM: Universal SIM In various embodiments disclosed in the disclosure, an eUICC may be fixed and loaded into a terminal. The eUICC may download and install a subscriber identifier and an encryption key (a CI public key or a CI certificate) in OTA from an SM-DP+ according to an operator. Furthermore, a profile which is a variety of information for a service provided from the operator may be stored in the eUICC. The eUICC may be a surface mounted device (SMD) type of an integrated circuit (IC) or a removable physical SIM.

A UICC may be a smart card inserted and used into a mobile communication terminal and may refer to a chip which stores personal information such as network access authentication information, a phone book, and an SMS of a mobile communication subscriber, performs subscriber authentication, and generates a traffic security key when accessing a network such as global system for mobile communication (GSM), wideband code division multiple access (WCDMA), or long-term evolution (LTE) to use secure mobile communication. The UICC may include information about an operator in advance at a time when it is manufactured.

A communication application of a SIM, a USIM, an ISIM, or the like may be loaded into the UICC according to a type of a mobile communication network a subscriber accesses. Furthermore, the UICC may provide a high-level security function for loading various applications such as an electronic wallet, ticketing, and an electronic passport.

In various embodiments, the eUICC is assumed as a chip type of secure module which is embedded in a terminal to be incapable of being removed. However, although a removable UICC has the same function and the same electrical and software characteristics as those of the eUICC in some embodiments, various embodiments are applicable in the same manner In various embodiments, the eUICC may download and install a "profile" over a network. There is no separate limit to a type of a network which downloads the profile.

The profile installed in the eUICC may refer to, for example, packaging at least one of an application, a file system, and an authentication key value stored in the eUICC in the form of software.

In various embodiments, the "USIM profile" may be used as the same meaning as the "profile". In some embodiments, the USIM profile may refer to packaging information included in a USIM application in the profile in the form of software.

In various embodiments, the SM-DP+ may be understood as a server which generates and manages a profile. The SM-DP+ may be understood as the concept of including a profile provider, an eUICC manager, and the like.

In various embodiments, an SM-DS may be represented as a discovery center, a discovery server, an address resolution server (ARS), or the like. The SM-DS may perform a discovery & push function (DPF), an event transmission function, or the like. The SM-DS may connect a plurality of SM-DP+ servers on a network.

In various embodiments, the "terminal" may be replaced with various terms, for example, a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile phone, or an electronic device. In the disclosure, a description will be given of the terminal or the simple expression UE.

In various embodiments, the terminal may include, but is not limited to, a machine to machine (M2M) terminal, a machine type communication (MTC) terminal/device.

Hereinafter, a description will be given of an electronic device according to various embodiments with reference to the accompanying drawings. In the disclosure, the term "user" may be referred to as a person who uses the electronic device or a device (e.g., an artificial intelligence electronic device) which uses the electronic device.

FIG. 1 illustrates a network environment for managing a UICC 120 and an eUICC 130 according to an embodiment.

Referring to FIG. 1, the network environment may include an SM-DP+ 210, an SM-DS 220, a CI 230, an EUM 240, and an MNO 300. The network environment shown in FIG. 1 is illustrative. A suitable component is added or a component which is not essential may be excluded, by those skilled in the art. For example, in an embodiment, the SM-DS 220 may be omitted.

The terminal 100 may include a controller 110, the UICC 120, and the eUICC 130. The controller 110 may control the UICC 120 and the eUICC 130. In an embodiment, the controller 110 may correspond to a communication processor (CP). However, in another embodiment, the controller 110 may be implemented as an application processor (AP) or an integrated chip in which a plurality of processors are included. Furthermore, the controller 110 may be implemented as a software module implemented by at least one processor. For example, the controller 110 may correspond to an LPA module implemented by an AP and a CP. The controller 110 may install a profile in the eUICC 130, may select a profile to be enabled among the installed profiles, may delete the installed profile, or may initialize the profile.

In an embodiment, the UICC 120 may be in a state where it is inserted into a socket of the terminal 100. A profile of a previously opened network operator may be installed in the UICC 120. The profile may include an IMSI and an MSISIN (e.g., a telephone number) corresponding to the network operator and a user of the terminal 100.

In an embodiment, the terminal 100 may include the controller 110 and the eUICC 130 without the UICC 120. Embodiments corresponding to when the terminal 100 does not the UICC 120 are described as a kind of modification example for an embodiment including the UICC 120 and the eUICC 130.

The eUICC 130 may store a CI public key or a CI certificate and a certificate and a private key of the eUICC 130. The eUICC 130 may authenticate an eUICC manager 213 having a certificate and a private key issued by a corresponding CI and/or a sub CI of the CI, using such a certificate and key.

The SD-DP+ 210 may include the profile provider 211 and the eUICC manager 213. In the disclosure, the description associated with the profile provider 211 and/or the eUICC manager 213 is applicable to the SM-DP+ 210. For example, that the eUICC 130 may authenticate the eUICC manager 213 may mean that the eUICC 130 may authenticate the SM-DP+ 210. Moreover, in the disclosure, the description associated with the SM-DP+ 210 is suitably applicable to at least one of the profile provider 211 and the eUICC manager 213.

In an embodiment, the profile provider 211 may have a certificate and a private key issued by a CI and a sub CI of the CI and may generate a profile package to perform an encryption operation.

In an embodiment, the eUICC 213 may transmit and receive a signal with the SM-DS 220 and may deliver information necessary to initiate profile download. This information may be delivered to the terminal 100 by the SM-DS 220. In an embodiment in which the SM-DS 220 is omitted, the terminal 100 may directly access the eUICC manager 213 through a previously collected URL of the eUICC manager 213.

Furthermore, the SM-DP+ 210 may perform a certificate authority verification operation in managing the eUICC. Herein, the SM-DP+ certificate may indicate a business entity such as the MNO 300 or a terminal manufacturer. The eUICC 130 may verify an eUICC management operation performed by the SM-DP+ 210 based on the SM-DP+ certificate.

In an embodiment, the SM-DP+ 210 may perform a profile management operation. For example, the profile management operation may include profile download, profile enable, profile disable, profile deletion, or the like.

In an embodiment, the SM-DP+ 210 may generate and encrypt a profile package. The SM-DP+ 210 may prepare for profile packages and may store the profile packages and profile protection keys for security of the profile packages. The SM-DP+ 210 may allocate EIDs to the profile packages.

In an embodiment, the SM-DS 220 may help to search for the eUICC manager 213 the eUICC 130 should connect to process an eUICC management event which is waiting. For example, the SM-DS 220 may deliver the eUICC management event to the eUICC 130 of the terminal 100 in a push manner In addition, servers of the CI 230 or the EUM 240 may be included in the network environment. In an embodiment, one or more servers/systems corresponding to the SM-DP+ 210, the SM-DS 220, the CI 230, and the EUM 240 may be referred to as eSIM servers 200. In an embodiment, when the terminal 100 knows the eUICC 213 the eUICC 130 should access, the SM-DS 220 may be omitted from the eSIM servers 200. In this case, the eUICC manager 213 may directly access the terminal 100 to process an event and may transmit and receive information necessary to initiate profile download.

The MNO server 300 may request the SM-DP+ 210 to prepare for a profile package for a specific eUICC. Moreover, the MNO server 300 may provide a signal for updating and managing a profile enabled in the eUICC 130 to the eUICC 130 via the terminal 100. Furthermore, in various embodiments, the MNO server 300 may be replaced with an MVNO server.

A secure channel may be established between the SM-DP+ 210 and the eUICC 130. As an example, the secure channel may be used during a period when a profile is downloaded and installed. Furthermore, the secure channel may be used in connection with transmitting a profile between the SM-DP+ 210 and the terminal 100. The terminal 100 may deliver a profile package to the eUICC 130.

In various embodiments, the profile may include subscriber identification information (e.g., an IMSI) of the terminal 100 and an encryption key (e.g., K) for authentication. Moreover, the profile may include a variety of information for communication service provided by a network operator.

The SM-DP+ 210, the SM-DS 220, the CI 230, the EUM 240, and the MNO 300 shown in FIG. 1 may be implemented as one or more servers. For example, the MNO 300 may be implemented by one server group or a plurality of server groups. Each server may include a communication circuit for transmitting and receiving data with a terminal or another server and a control circuit or an arithmetic operation circuit for processing data.

Figure 2:
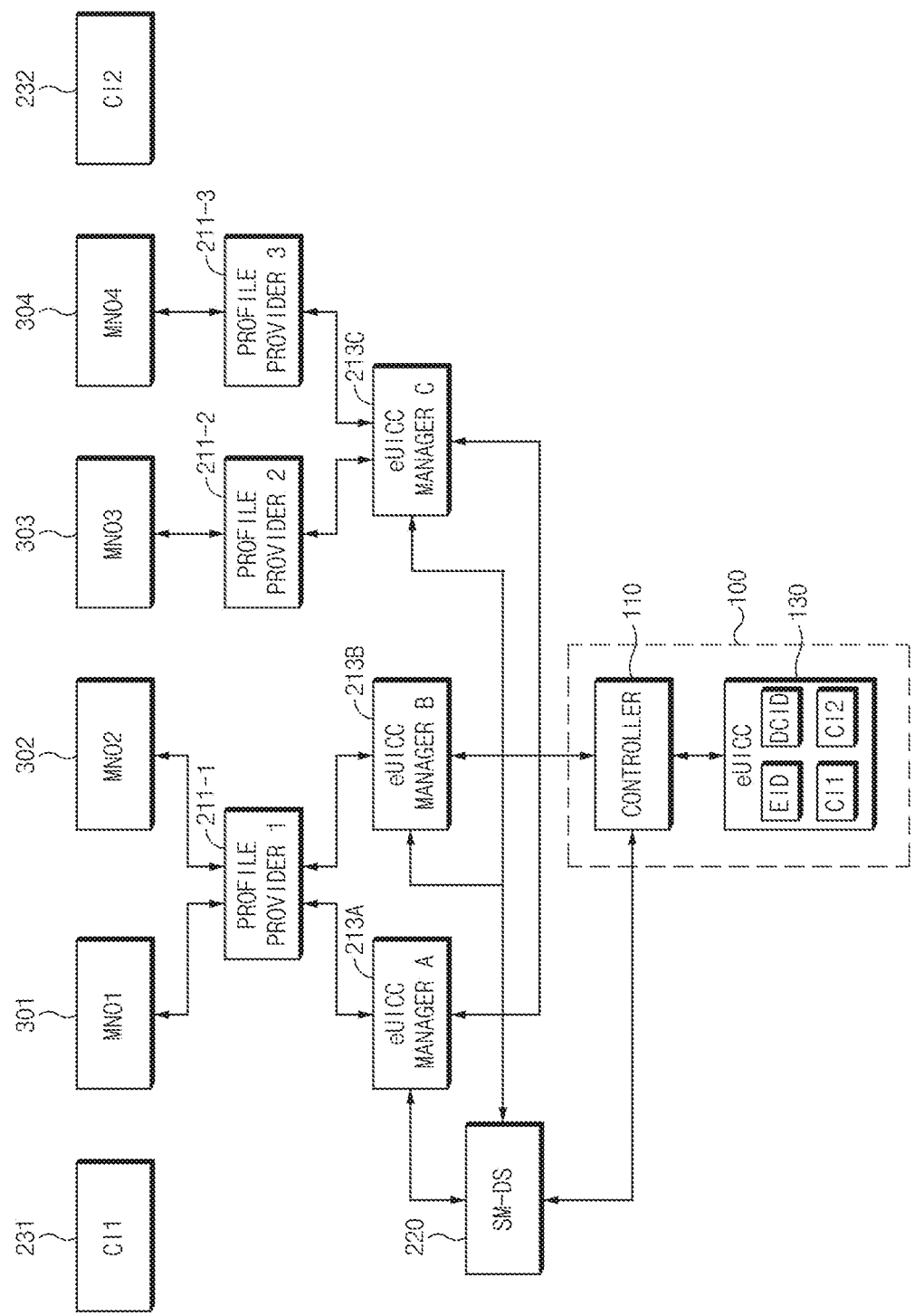
FIG. 2 illustrates a network environment for managing a UICC and an eUICC according to another embodiment.

FIG. 2 illustrates a network environment for managing a UICC 120 and an eUICC 130 according to another embodiment.

Referring to FIG. 2, a plurality of MNO servers may interwork with one or more profile providers. For example, an MNO 1 301 and an MNO 2 302 may interwork with a first profile provider 211-1, and an MNO 3 303 may interwork with a second profile provider 211-2. An MNO 4 may interwork with a third profile provider 211-3. The respective profile providers 211-1, 211-2, and 211-3 may interwork with one MNO BSS or a plurality of MNO BSSs.

In an embodiment, eUICC managers 213A, 213B, and 213C may interwork with one or more profile providers. For example, the eUICC manager A 213A and the eUICC manager B 213B may interwork with the first profile provider 211-1, and the eUICC manager C 213C may interwork with the second profile provider 211-2 and the third profile provider 211-3.

The eUICC managers 213A, 213B, and 213C may interwork with an SM-DS 220. The SM-DS 220 may provide information (e.g., a URL) about an eUICC manager a terminal 100 should access to download a profile among a plurality of eUICC managers to the terminal 100. In an embodiment, the SM-DS 250 may store the information in the SM-DS 250 and may immediately notify the terminal 100 (push) of the information (push). In another embodiment, the terminal 100 may access the SM-DS 250 and may directly read the stored information (pull).

The one terminal 100 may interwork with the plurality of eUICC managers 213A, 213B, and 213C. The eUICC 130 may store a plurality of CI certificates or CI public keys and may authenticate an eUICC manager and a profile provider using these certificates and public keys. For example, in the example of FIG. 2, the eUICC 130 may include a certificate corresponding to CI1 and CI2 and may an authentication procedure with an eUICC manager/profile provider corresponding to the corresponding certificate. When the authentication is completed, the terminal 100 may download a profile from the corresponding eUICC manager/profile provider (e.g., an SM-DP+).

Figure 3:
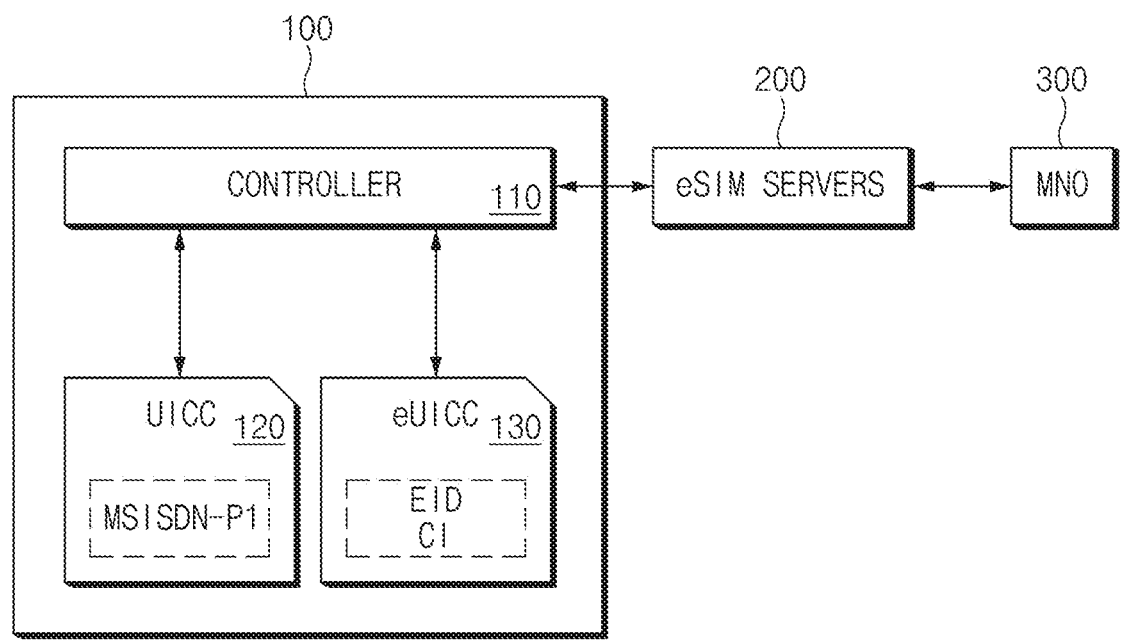
FIG. 3 illustrates an environment in which a profile is remotely installed, including a terminal, an eSIM server, and an MNO server, according to an embodiment.

FIG. 3 illustrates an environment in which a profile is remotely installed, including a terminal, an eSIM server, and an MNO server, according to an embodiment.

Referring to FIG. 3, a terminal 100 may include a UICC 120, an eUICC 130, and a controller 110 for controlling the UICC 120 and the eUICC 130. No details duplicated by the above-mentioned description will be provided in conjunction with the components of the terminal 100.

A profile of a previously opened network operator is installed in the UICC 120. For example, a telephone number of a profile corresponding to the UICC 120 may be assumed as an MSISDN-P1.

In an embodiment, an identifier of the eUICC 130 may be an EID, and an OTA encryption key CI may be stored in the eUICC 130. A profile of a network operator which is the same or different from the opened network operator in the UICC 120 may be installed in the eUICC 130, and a single profile may fail to be installed in the eUICC 130. Because a plurality of profiles are able to be installed in the eUICC 130, various embodiments of installing a profile in the eUICC 130 using a profile of the UICC 120 are applicable irrespective of the existence, number, or state of profile(s) installed in the eUICC 130.

The terminal 100 may access an eSIM server 200 according to information provided from an MNO server 300 to install a new profile and may start an authentication procedure for downloading a profile. As described above, the eSIM server 200 may be understood as being the concept of including an SM-DP+ 210, an SM-DP 220, a CI 230, an EUM 240, or the like. As an embodiment, the MNO server 300 may be referred to as a first server, and the eSIM server 200 may be referred to as a second server associated with the first server.

According to an embodiment, the terminal 100 may install and enable a profile in the eUICC 130 while maintaining an old telephone number. For example, when the profile of the UICC 120 includes a first IMSI and a first MSISDN (i.e., an MSISDN-P1) as identification information, as profile installation according to an embodiment progresses, the profile installed in the eUICC 130 may have a second IMSI and a second MSISDN as identification information. The first MSISDN and the second MSISDN, each of which is the MSISDN-P1, may be the same as each other. That is, a user may replace the UICC 120 with the eUICC 130 while maintaining a previously used telephone number. Herein, in this case, the first IMSI and the second IMSI may have different values. Furthermore, when the installation and enabling of the profile of the eUICC 130 is completed, the existing UICC 120 may be deactivated. A detailed operation associated with this will be described with reference to FIGS. 4 to 6.

Additionally or alternatively, when the terminal 100 does not include the UICC 120, it may access the eSIM server 200 to proceed with an authentication procedure for subscriber identification information. For example, the terminal 100 may authenticate the user or subscriber identification information (e.g., an IMSI) of the user using account information associated with a network operator, account information associated with the terminal 100, account information associated with a manufacturer of the terminal 100, e-mail or SNS service account information, or the other unique information about the user. When the authentication is completed, the terminal 100 may download and install a profile corresponding to the authenticated subscriber identification information in the eUICC 130.

Figure 4:
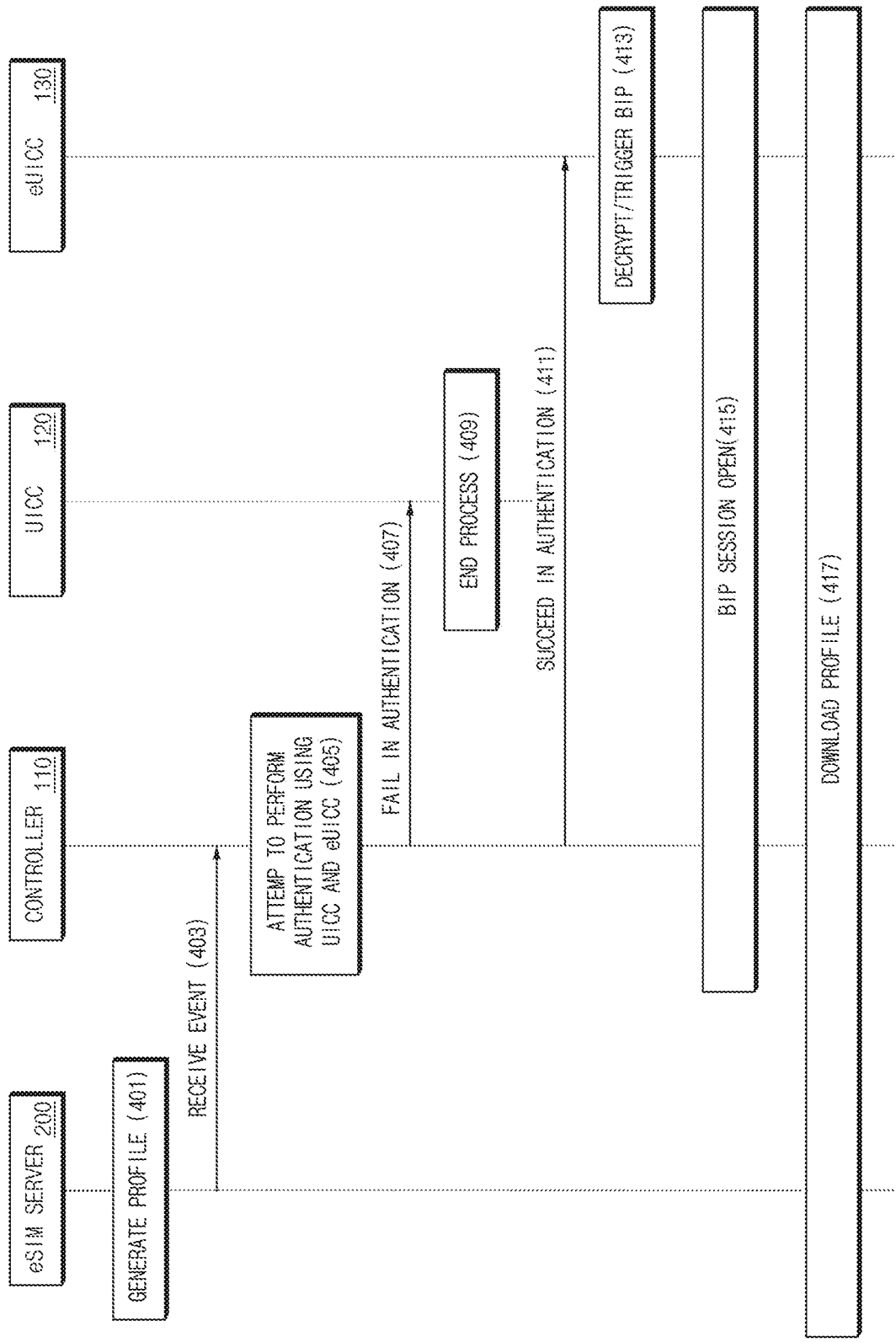
FIG. 4 illustrates a process in which a terminal downloads a profile, according to an embodiment.

FIG. 4 illustrates a process in which a terminal downloads a profile, according to an embodiment. An embodiment shown in FIG. 4 is applicable in common to embodiments of FIGS. 5 and 6, described below.

Referring to FIG. 4, in operation 401, an eSIM server 200 may generate a profile to be installed in an eUICC 130 of a terminal 100. The eSIM server 200 may generate the profile to be installed in the eUICC 130 based on profile information of a UICC 120. For example, the newly generated profile may include at least one same identification information (e.g., MSISDN) as a profile of the UICC 120. For example, the newly generated profile may be updated with the at least one same identification information (e.g., MSISDN) as the profile of the UICC 120 in a process where it is registered with an MNO server 300.

In operation 403, the terminal 100 may receive an event associated with installing the profile from the eSIM server 200. The terminal 100 may obtain event information from a network using an RF circuit connected with a controller 110. The terminal 100 may include an antenna and an RF circuit for using a suitable frequency band a radio access technology (RAT). Herein, a detailed description of the RF circuit will be omitted to avoid blurring the gist of the disclosure.

In an embodiment, the event may be a push event received from an SM-DS 220. In another embodiment, the event may correspond to receiving an activation code via the MNO server 300.

The event may include URL information of the eSIM server 200 the terminal should access to perform authentication and/or download a profile.

In operation 405, the terminal 100 may attempt to perform authentication using the UICC 120 and the eUICC 130. For example, the controller 110 may access a URL of the eSIM server 200, included in the event, and may attempt to perform the authentication using the UICC 120 and the eUICC 130. Additionally or alternatively, when the terminal 100 does not include the UICC 120, it may access the URL of the eSIM server 200 and may authenticate a user or subscriber identification information of the user. In this case, operations 407 to 409 below may be omitted.

In operation 407, the authentication using the UICC 120 fails. Although there should be a CI certificate to succeed in authentication with the eSIM server 200, because the UICC 120 does not have the CI certificate, the authentication for the UICC 120 fails. In operation 409, the controller 110 ends the authentication procedure based on the UICC 120.

In operation 411, the controller 110 may succeed in the authentication using the eUICC 130. For example, the terminal 100 may authenticate an SM-DP+ 210 with a CI certificate included in the eUICC 130.

When succeeding in the authentication, in operation 413, the controller 413 may trigger a bearer independent protocol (BIP) to the eUICC 130 corresponding to an EID. In operation 415, a BIP session between the controller 110 and the eUICC 130 may be opened. In an embodiment, in operation 415, a secure channel may be established among the eUICC 130, the controller 110, and the eSIM server 200. In operation 417, the terminal 100 may download a profile from the eSIM server 200.

According to an embodiment, when the profile is downloaded to the eUICC 130, the MNO server 300 may disable the profile of the UICC 120 and may register the profile of the eUICC 130 with the network. For example, when the profile of the UICC 120 has a first IMSI and a first MSISDN and identification information of the UICC 120 is an ICCID and when the profile installed in the eUICC 130 has a second IMSI and the first MSISDN and identification information of the eUICC 130 is an EID, the MNO server 300 may bind the first MSISDN and the EID. Thus, before and after performing the process, the network (e.g., the MNO server 200) may equally recognize a telephone number of the terminal 100 as an MSISDN, but the terminal 100 may not access the network any longer through the profile of the UICC 120. The terminal 100 may enable the profile of the eUICC 130 and may access the network.

Figure 5:
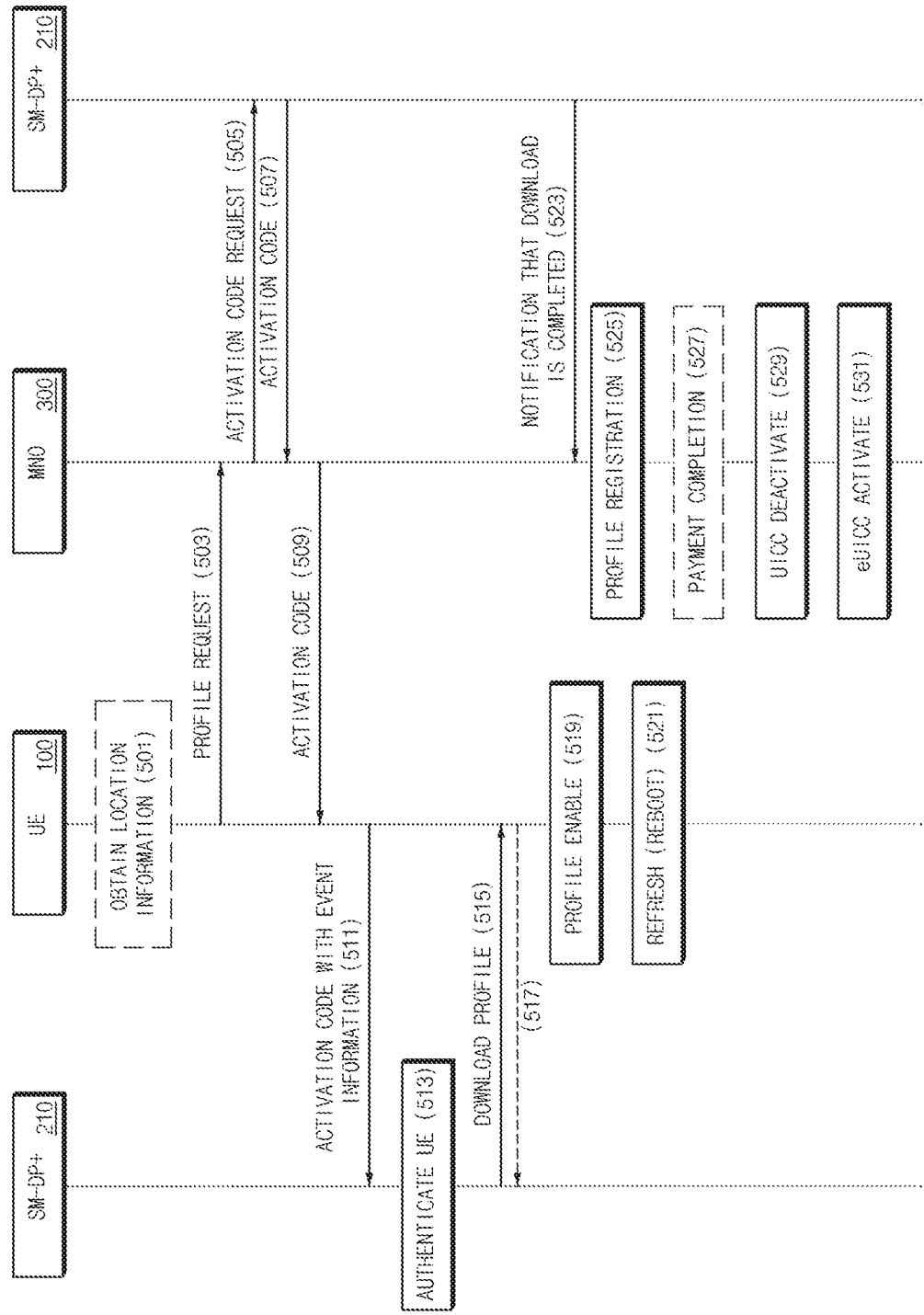
FIG. 5 illustrates a method for installing a profile in a network environment in which an SM-DS is not included, according to an embodiment.

FIG. 5 illustrates a method for installing a profile in a network environment in which an SM-DS is not included, according to an embodiment. In the signal sequence diagram of FIG. 5, an SM-DP+ 210 is displayed at both ends to indicate direct data flow between the SM-DP+ 210 and a terminal 100.

Referring to FIG. 5, in operation 501, the terminal 100 may obtain location information of the terminal 100. For example, the terminal 100 may compare information, such as a home location register (HLR) or a GPS, capable of ascertaining a current location of the terminal 100, with an ICCID of a UICC 120 or an MCC/MNC of an IMSI. The terminal 100 may determine whether it is currently located in a country where the UICC 120 is opened, from the compared result.

In an embodiment, only when the terminal 100 is currently located in the country where the UICC 120 is opened, it may perform a profile replacement process. For example, only when the location information of the terminal 100 corresponds to country information (e.g., an MCC) of an IMSI of a profile of the UICC 120, a profile to be installed in an eUICC 130 may be requested. However, in another embodiment, although the terminal 100 is not currently located in the country where the UICC 120 is opened, it may first perform a download procedure for the profile to be installed in the eUICC 130. Only the enabling of the profile may proceed after the terminal 100 arrives at the country where the UICC 120 is opened. For convenience of description, in the process of FIG. 5, it is assumed that the terminal 100 is currently located in the country where the UICC 120 is opened.

In operation 503, the terminal 100 may request a profile to be installed in the eUICC 130 from an MNO server 300. For example, the terminal 100 may access the MNO server 300 of a corresponding network operator based on the MNC included in the IMSI of the UICC 120 and may request the profile to be installed in the eUICC 130. Personal information, information (e.g., an IMEI, an EID (optional), or the like) of the terminal 100, information of the UICC 120 (e.g., a SIM type (e.g., an ISIM, USIM, or the like) corresponding to the UICC 120, an ICCID, an MSISDN, an IMSI, or the like) for generating an activation code may be included in the profile request transmitted from the terminal 100.

In an embodiment, operation 503 may be performed after payment is completed. For example, a service charge associated with changing the UICC 120 to the eUICC 130 may be charged. After the payment of the charge is completed, operation 503 may be performed. In another embodiment, after all procedures progress, the payment may be performed at a time when the terminal 100 completes registration with the network using the eUICC 130. In the process of FIG. 5, a description will be given on the basis of performing the payment at a later time. In a process of FIG. 6 described below, a description will be given on the basis of first performing the payment. However, the payment operation may be performed at a suitable time in the process of FIG. 5 or 6. Alternatively, the payment operation may be omitted according to a policy (e.g., no charge) of a network operator.

When receiving the profile request from the terminal 100, in operation 505, the MNO server 300 may request an activation code from the SM-DP+ 210. Furthermore, when the MNO server 300 generates and stores the activation code in advance from the SM-DP+ 210 according to an MNO and receives the profile request from the terminal 100, it may transmit the previously generated activation code. For example, the MNO server 300 may request an activation code for generating a suitable profile based on the information of the UICC 120, included in the profile request, from the SM-DP+ server 210 based on a new ICCID. All or a portion of the information included in the profile request of operation 503 may be included in the activation code request. For example, information about a profile previously installed in the UICC 120 may be included in the activation code request. This information may be used to generate a profile to be installed in the eUICC 120.

In operation 507, the SM-DP+ 210 may provide the activation code to the MNO server 300 in response to the activation code request. In operation 509, the MNO server 300 may provide the activation code to the terminal 100. In an embodiment, the activation code may be generated in advance in the MNO server 300 according to an MNO. For example, although the MNO server 300 does not have information about the terminal 100, it may generate/provide the activation code. Operation 509 may correspond to operation 403 of FIG. 4.

In an embodiment, information for determining whether the profile download request of the terminal 100 is valid may be included in the activation code. For example, a matching ID which is unique identification information generated by the SM-DP+ 210, ICCID information of the UICC 120 associated with the matching ID, a new ICCID, an ICCID of the UICC 120, an EID of the eUICC 130, a code version which is an operator code of the SM-DP+ 210, URL information of the SM-DP+ 210, or the like may be included in the activation code.

In operation 511, the terminal 100 may transmit the activation code together with information of the terminal 100, event information, or the like to the SM-DP+ server 210. In an embodiment, the event information may include information indicating whether an event requested by the terminal 100 is profile download, device swap, a UICC change, or the like. Moreover, in an embodiment, when the SM-DP+ 210 already knows what the operation the terminal 100 wants to perform is by operation 503 or the like, the event information may be omitted. In FIG. 5, it is assumed that the event information is profile download for replacing the UICC 120 to the eUICC 130.

In operation 513, the SM-DP+ 210 may authenticate the terminal 100. The SM-DP+ 210 may authenticate the terminal 100 based on the authentication related information (e.g., the activation code, the CI information, the EID information, or the like) provided in operation 511 from the terminal 100. Herein, in an embodiment, a new activation code may be transmitted to the terminal 100 in response to operation 511 for security, and the terminal 100 may be authenticated based on the authentication related information received from the terminal 100. Operation 513 may correspond to operations 405, 411, and 413 of FIG. 4. When the authentication is completed, a secure channel may be established between the terminal 100 and the SM-DP+ server 210 (e.g., operation 415).

When the terminal 100 is authenticated, in operation 515, the terminal 100 may download the profile from the SM-DP+ 210. The profile downloaded in operation 515 may be to be installed in the eUICC 130 and may have an IMSI value different from the profile installed in the UICC 120 and may have the same MSISDN value as the profile installed in the UICC 120. Operation 515 may correspond to operation 417 of FIG. 4. The profile downloaded in operation 515 may have an IMSI and MSISDN value which varies with an MNO and may be updated with the same identification information (e.g., MSISDN) as the profile of the UICC 120.

When the installation of the profile is completed after the profile is downloaded, in operation 517, the terminal 100 may notify the SM-DP+ 210 that the installation of the profile is completed. In operation 519, the terminal 100 may enable the profile installed in the eUICC 130. The profile installed in the UICC 120 of the terminal 100 may be disabled. In operation 521, the terminal 100 may refresh the UICC 120 and the eUICC 130 or may reboot itself to refresh the UICC 120 and the eUICC 130.

When the installation of the profile is completed (operation 517), the SM-DP+ 210 may notify the MNO server 300 that the installation of the profile is completed. In operation 525, the MNO server 300 may bind an old MSISDN of the UICC 120 to the profile newly installed in the eUICC 130. Furthermore, when an MSISDN of the profile installed in the eUICC differs from a UICC according to an operator, the MSISDN may be additionally updated to the installed profile. For example, the MNO server 300 may register the IMSI of the eUICC 130 and the old MSISDN of the UICC 120 together with a network. In an embodiment, when the SM-DP+ 210 provides information about the profile provided to the terminal 100 to the MNO server 300, operation 525 may be performed before operation 515.

In operation 527, the MNO server 300 may determine whether the payment of a charge associated with a change from the terminal 100 to the eUICC 130 is completed. As described above, the order of the payment operation may be changed or the payment operation may be omitted.

In operation 529, the MNO server 300 may deactivate the UICC 120 on the network. In operation 531, the MNO server 300 may activate the eUICC 130. Thus, the terminal 100 may access the network with the same number as an old number using the profile of the eUICC 130.

Figure 6:
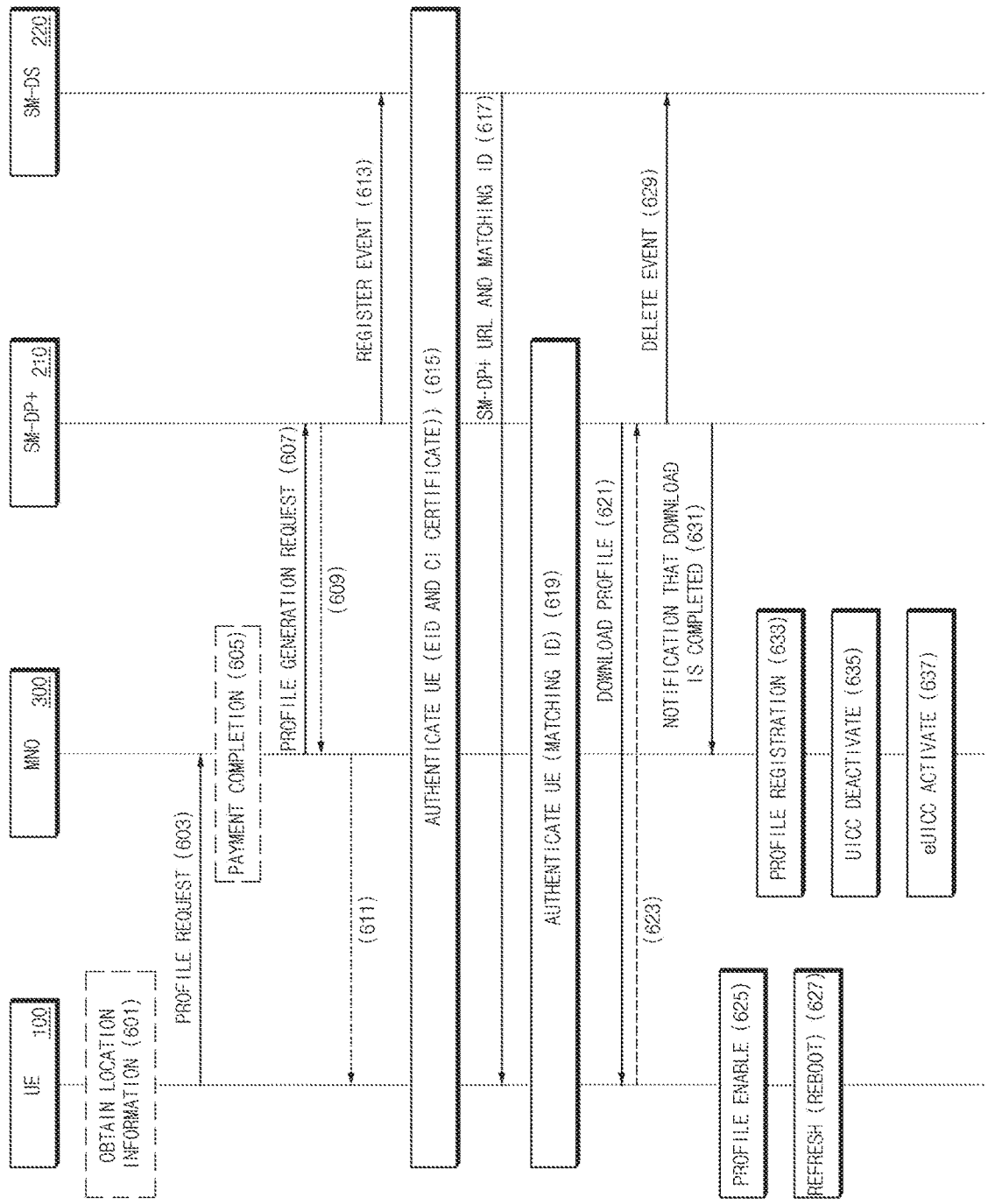
FIG. 6 illustrates a method for installing a profile in a network environment in which an SM-DS is included, according to an embodiment.

FIG. 6 illustrates a method for installing a profile in a network environment in which an SM-DS is included, according to an embodiment. FIG. 6 illustrates a process which varies when an SM-DS 220 is added in the system of FIG. 5. Thus, the details described with reference to FIG. 5 are applicable the same or similarly to those in FIG. 6, and duplicated details will be omitted.

In operation 601, a terminal 100 may obtain current location information of the terminal 100. This operation may correspond to operation 501 or may be omitted.

In operation 603, the terminal 100 may request a profile to be installed in an eUICC 130 from an MNO server 300. Operation 603 may correspond to operation 503.

In operation 605, the MNO server 300 may determine whether the payment of a service charge associated with changing a UICC 120 to the eUICC 130 is completed. In an embodiment, due to national security or the like, there may be a limit in joining an MNO of another country in a country. Thus, only when it is located in a country where the UICC 120 is opened, the payment operation may be performed. Operation 605 may correspond to operation 527.

In operation 607, the MNO server 300 may transmit a profile generation request to an SM-DP+ 210. In operation 607, the MNO server 300 may transmit the profile generation request together with an EID, a new ICCID, or URL information (e.g., DSID) of the SM-DS 220 to the SM-DP+ 210. When profile preparation is completed, in operation 609, the SM-DP+ 210 may notify the MNO server 300 that the preparation is completed. In operation 611, the MNO server 300 may notify the terminal 100 that the profile is prepared. In this case, the MNO 300 may provide DSID information to the terminal 100. However, in an embodiment, the terminal 100 or the eUICC 130 may have the DSID information in the eUICC 130. In such an example, the DSID information may fail to be provided to the terminal 100.

Together with providing the notification that the profile is prepared, in operation 613, the SM-DP+ 210 may register an event requested by the terminal 100 with the SM-DS 220. Herein, the event may correspond to an event described with reference to operation 511 in FIG. 5. When the event is registered, the SM-DS 220 may notify the terminal 100 of the registered event (e.g., a push notification).

In operation 615, authentication between the terminal 100 and the SM-DS 220 may be performed. For example, the authentication between the terminal 100 and the SM-DS 220 may be performed based on an EID or a CI. When the authentication is completed, in operation 617, the SM-DS 220 may provide a URL and a matching ID of the SM-DP+ 210 the terminal 100 should access to the terminal 100.

When the terminal 100 accesses the SM-DP+ 210 using the URL of the SM-DP+ 210, in operation 619, authentication between the terminal 100 and the SM-DP+ 210 may be performed. The authentication between the terminal 100 and the SM-DP+ 210 may be performed based on the EID or an additional EID. Operation 619 may correspond to operation 513 of FIG. 5.

When the authentication is completed, in operation 621, the terminal 100 may download a profile from the SM-DP+ 210. When the installation of the downloaded profile is completed, in operation 623, the terminal 100 may notify the SM-DP+ 210 that the installation of the profile is completed. Operations 621 and 623 may correspond to operations 515 and 517 of FIG. 5, respectively. Meanwhile, when receive the notification that the installation is completed, the SM-DP+ 210 may determine that all the registered event is performed and may request the SM-DS 220 to delete the event.

Operations 625, 627, 631, 633, 635, and 637 may correspond to operations 519, 521, 523, 525, 529, and 531 of FIG. 5, respectively.

According to an embodiment, the operation of the terminal 100 may be understood as being described below. The terminal 100 may include a UICC 120 in which a first profile is installed, an eUICC 130, and a processor (e.g., a controller 110) electrically connected with the UICC 120 and the eUICC 130. The processor may request a second profile to be installed in the eUICC from a first server (e.g., an MNO server 300) based on the first profile, may receive the second profile from a second server (e.g., an SM-DP+ 210) associated with the first server, and may install the received second profile in the eUICC 130. Herein, the second profile may include the same subscriber identification information (e.g., telephone number, MSISDN, or the like) as the first profile.

According another embodiment, the operation of the terminal 100 may be understood as being described below. The terminal 100 may include an eUICC 130 and a processor (e.g., a controller 110) electrically connected with the eUICC 130. The processor may authenticate a first profile using user account information or the like for a first server, may request a second profile to be installed in the eUICC 130 from the first server according to the authenticated result, may receive the second profile from a second server (e.g., an SM-DP+ 210) associated with the first server, and may install the received second profile in the eUICC 130. Herein, the second profile may include the same subscriber identification information (e.g., telephone number, MSISDN, or the like) as the first profile.

According to various embodiments, the terminal 100 may further include an additional component to perform various functions. Examples of the terminal 100, associated with this, will be described with reference to FIGS. 7 to 9.

Figure 7:
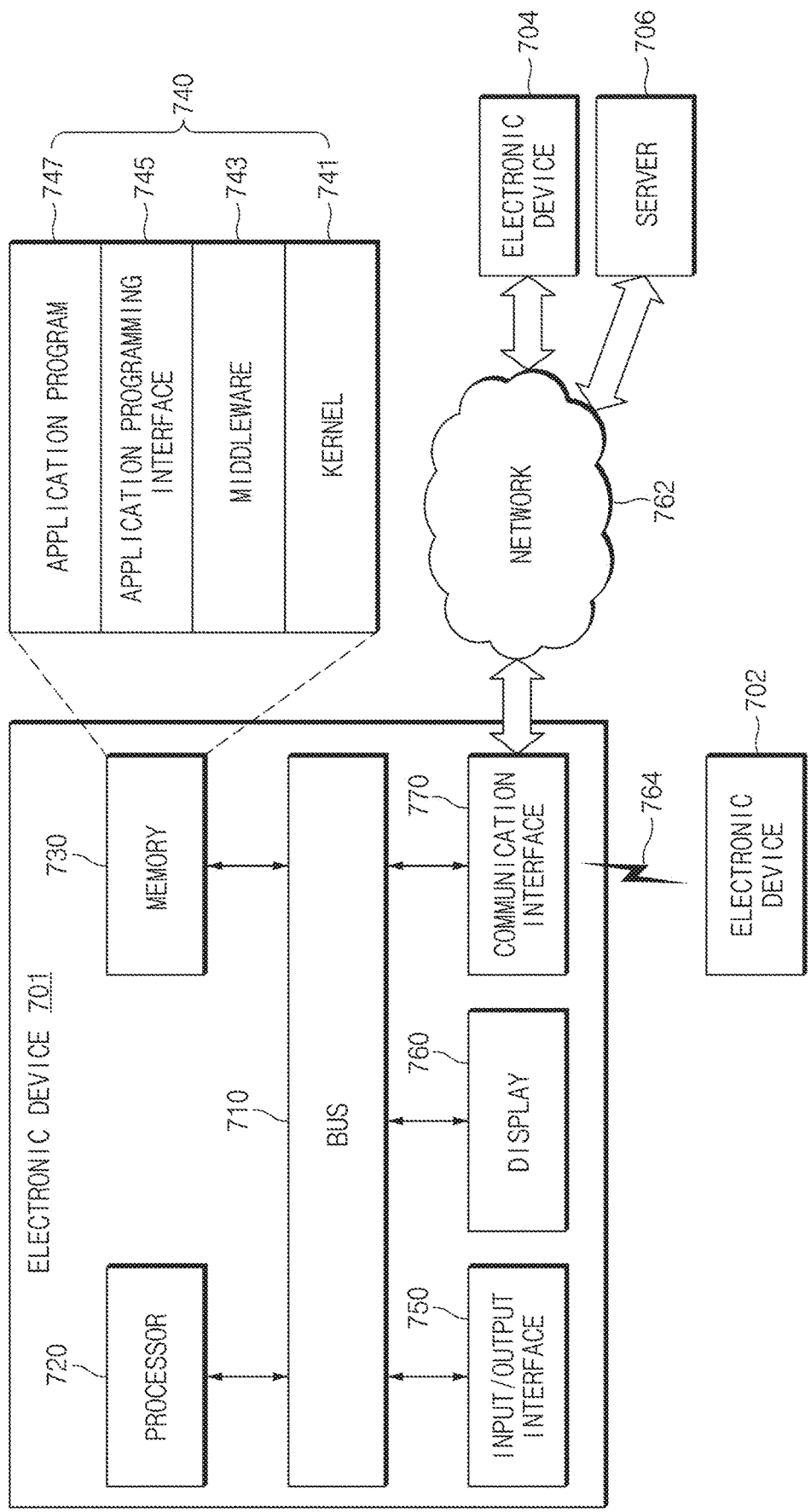
FIG. 7 illustrates an electronic device in a network environment according to various embodiments of the present disclosure.

FIG. 7 illustrates an electronic device in a network environment, according to various embodiments.

Referring to FIG. 7, according to various embodiments, an electronic device 701, a first electronic device 702, a second electronic device 704, or a server 706 may be connected with each other over a network 1162 or local wireless communication 764. The electronic device 701 may include a bus 1110, a processor 720, a memory 730, an input/output interface 750, a display 760, and a communication interface 770. According to an embodiment, the electronic device 701 may not include at least one of the above-described elements or may further include other element(s).

For example, the bus 710 may interconnect the above-described elements 710 to 770 and may include a circuit for conveying communications (e.g., a control message and/or data) among the above-described elements.

The processor 720 may include one or more of a central processing unit (CPU), an application processor (AP), or a communication processor (CP). For example, the processor 720 may perform an arithmetic operation or data processing associated with control and/or communication of at least other elements of the electronic device 701.

The memory 730 may include a volatile and/or nonvolatile memory. For example, the memory 730 may store instructions or data associated with at least one other element(s) of the electronic device 701. According to an embodiment, the memory 730 may store software and/or a program 740. The program 740 may include, for example, a kernel 741, a middleware 743, an application programming interface (API) 745, and/or an application program (or "application") 747. At least a part of the kernel 741, the middleware 743, or the API 745 may be referred to as an "operating system (OS)".

For example, the kernel 741 may control or manage system resources (e.g., the bus 1110, the processor 720, the memory 730, and the like) that are used to execute operations or functions of other programs (e.g., the middleware 743, the API 745, and the application program 747). Furthermore, the kernel 741 may provide an interface that allows the middleware 743, the API 745, or the application program 747 to access discrete elements of the electronic device 701 so as to control or manage system resources.

The middleware 743 may perform, for example, a mediation role such that the API 745 or the application program 747 communicates with the kernel 741 to exchange data.

Furthermore, the middleware 743 may process one or more task requests received from the application program 747 according to a priority. For example, the middleware 743 may assign the priority, which makes it possible to use a system resource (e.g., the bus 1110, the processor 720, the memory 730, or the like) of the electronic device 701, to at least one of the application program 747. For example, the middleware 743 may process the one or more task requests according to the priority assigned to the at least one, which makes it possible to perform scheduling or load balancing on the one or more task requests.

The API 745 may be, for example, an interface through which the application program 747 controls a function provided by the kernel 741 or the middleware 743, and may include, for example, at least one interface or function (e.g., an instruction) for a file control, a window control, image processing, a character control, or the like.

The input/output interface 750 may play a role, for example, an interface which transmits an instruction or data input from a user or another external device, to other element(s) of the electronic device 701. Furthermore, the input/output interface 750 may output an instruction or data, received from other element(s) of the electronic device 701, to a user or another external device.

The display 760 may include, for example, a liquid crystal display (LCD), a light-emitting diode (LED) display, an organic LED (OLED) display, a microelectromechanical systems (MEMS) display, or an electronic paper display. The display 760 may display, for example, various contents (e.g., a text, an image, a video, an icon, a symbol, and the like) to a user. The display 760 may include a touch screen and may receive, for example, a touch, gesture, proximity, or hovering input using an electronic pen or a part of a user's body.

For example, the communication interface 770 may establish communication between the electronic device 701 and an external device (e.g., the first electronic device 702, the second electronic device 704, or the server 706). For example, the communication interface 770 may be connected to the network 762 over wireless communication or wired communication to communicate with the external device (e.g., the second electronic device 704 or the server 706).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the local wireless communication 764. The local wireless communication 764 may include at least one of wireless fidelity (Wi-Fi), light fidelity (Li-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 701 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 762 may include at least one of telecommunications networks, for example, a computer network (e.g., LAN or WAN), an Internet, or a telephone network.

Each of the first and second electronic devices 702 and 704 may be a device of which the type is different from or the same as that of the electronic device 701. According to an embodiment, the server 706 may include a group of one or more servers. According to various embodiments, all or a portion of operations that the electronic device 701 will perform may be executed by another or plural electronic devices (e.g., the first electronic device 702, the second electronic device 704 or the server 706). According to an embodiment, in the case where the electronic device 701 executes any function or service automatically or in response to a request, the electronic device 701 may not perform the function or the service internally, but, alternatively additionally, it may request at least a portion of a function associated with the electronic device 701 at other electronic device (e.g., the electronic device 702 or 704 or the server 706). The other electronic device may execute the requested function or additional function and may transmit the execution result to the electronic device 701. The electronic device 701 may provide the requested function or service using the received result or may additionally process the received result to provide the requested function or service. To this end, for example, cloud computing, distributed computing, or client-server computing may be used.

Figure 8:
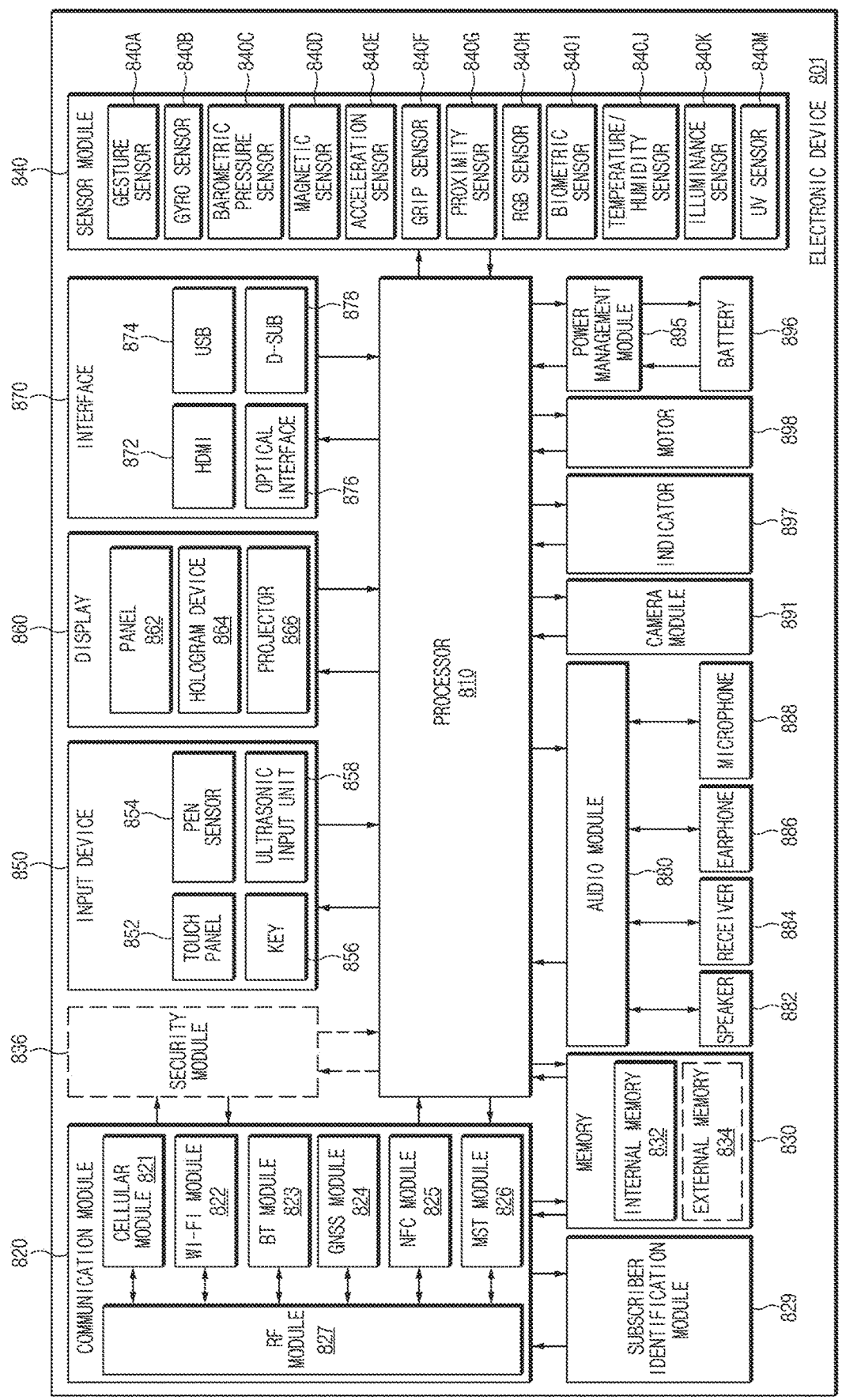
FIG. 8 is a block diagram of an electronic device according to various embodiments of the present disclosure.

FIG. 8 illustrates a block diagram of an electronic device, according to various embodiments.

Referring to FIG. 8, an electronic device 801 may include, for example, all or a part of the electronic device 701 illustrated in FIG. 7. The electronic device 801 may include one or more processors (e.g., an application processor (AP)) 810, a communication module 820, a subscriber identification module 829, a memory 830, a sensor module 840, an input device 850, a display 860, an interface 870, an audio module 880, a camera module 891, a power management module 895, a battery 896, an indicator 897, and a motor 898.

The processor 810 may drive, for example, an operating system (OS) or an application to control a plurality of hardware or software elements connected to the processor 810 and may process and compute a variety of data. For example, the processor 810 may be implemented with a System on Chip (SoC). According to an embodiment, the processor 810 may further include a graphic processing unit (GPU) and/or an image signal processor. The processor 810 may include at least a part (e.g., a cellular module 821) of elements illustrated in FIG. 8. The processor 810 may load an instruction or data, which is received from at least one of other elements (e.g., a nonvolatile memory), into a volatile memory and process the loaded instruction or data. The processor 810 may store a variety of data in the nonvolatile memory.

The communication module 820 may be configured the same as or similar to the communication interface 770 of FIG. 7. The communication module 820 may include the cellular module 821, a Wi-Fi module 822, a Bluetooth (BT) module 823, a GNSS module 824 (e.g., a GPS module, a Glonass module, a Beidou module, or a Galileo module), a near field communication (NFC) module 825, a MST module 826 and a radio frequency (RF) module 827.

The cellular module 821 may provide, for example, voice communication, video communication, a character service, an Internet service, or the like over a communication network. According to an embodiment, the cellular module 821 may perform discrimination and authentication of the electronic device 801 within a communication network by using the subscriber identification module (e.g., a SIM card) 829. According to an embodiment, the cellular module 821 may perform at least a portion of functions that the processor 810 provides. According to an embodiment, the cellular module 821 may include a communication processor (CP).

Each of the Wi-Fi module 822, the BT module 823, the GNSS module 824, the NFC module 825, or the MST module 826 may include a processor for processing data exchanged through a corresponding module, for example. According to an embodiment, at least a part (e.g., two or more) of the cellular module 821, the Wi-Fi module 822, the BT module 823, the GNSS module 824, the NFC module 825, or the MST module 826 may be included within one Integrated Circuit (IC) or an IC package.

For example, the RF module 827 may transmit and receive a communication signal (e.g., an RF signal). For example, the RF module 827 may include a transceiver, a power amplifier module (PAM), a frequency filter, a low noise amplifier (LNA), an antenna, or the like. According to another embodiment, at least one of the cellular module 821, the Wi-Fi module 822, the BT module 823, the GNSS module 824, the NFC module 825, or the MST module 826 may transmit and receive an RF signal through a separate RF module.

The subscriber identification module 829 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 830 (e.g., the memory 730) may include an internal memory 832 or an external memory 834. For example, the internal memory 832 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 834 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 834 may be operatively and/or physically connected to the electronic device 801 through various interfaces.

A security module 836 may be a module that includes a storage space of which a security level is higher than that of the memory 830 and may be a circuit that guarantees safe data storage and a protected execution environment. The security module 836 may be implemented with a separate circuit and may include a separate processor. For example, the security module 836 may be in a smart chip or a secure digital (SD) card, which is removable, or may include an embedded secure element (eSE) embedded in a fixed chip of the electronic device 801. Furthermore, the security module 836 may operate based on an operating system (OS) that is different from the OS of the electronic device 801. For example, the security module 836 may operate based on java card open platform (JCOP) OS.

The sensor module 840 may measure, for example, a physical quantity or may detect an operation state of the electronic device 801. The sensor module 840 may convert the measured or detected information to an electric signal. For example, the sensor module 840 may include at least one of a gesture sensor 840A, a gyro sensor 840B, a barometric pressure sensor 840C, a magnetic sensor 840D, an acceleration sensor 840E, a grip sensor 840F, the proximity sensor 840G, a color sensor 840H (e.g., red, green, blue (RGB) sensor), a biometric sensor 840I, a temperature/humidity sensor 840J, an illuminance sensor 840K, or an UV sensor 840M. Although not illustrated, additionally or generally, the sensor module 840 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 840 may further include a control circuit for controlling at least one or more sensors included therein. According to an embodiment, the electronic device 801 may further include a processor that is a part of the processor 810 or independent of the processor 810 and is configured to control the sensor module 840. The processor may control the sensor module 840 while the processor 810 remains at a sleep state.

The input device 850 may include, for example, a touch panel 852, a (digital) pen sensor 854, a key 856, or an ultrasonic input unit 858. For example, the touch panel 852 may use at least one of capacitive, resistive, infrared and ultrasonic detecting methods. Also, the touch panel 852 may further include a control circuit. The touch panel 852 may further include a tactile layer to provide a tactile reaction to a user.

The (digital) pen sensor 854 may be, for example, a part of a touch panel or may include an additional sheet for recognition. The key 856 may include, for example, a physical button, an optical key, or a keypad. The ultrasonic input device 858 may detect (or sense) an ultrasonic signal, which is generated from an input device, through a microphone (e.g., a microphone 888) and may check data corresponding to the detected ultrasonic signal.

The display 860 (e.g., the display 760) may include a panel 862, a hologram device 864, or a projector 866. The panel 862 may be the same as or similar to the display 760 illustrated in FIG. 7. The panel 862 may be implemented, for example, to be flexible, transparent or wearable. The panel 862 and the touch panel 852 may be integrated into a single module. The hologram device 864 may display a stereoscopic image in a space using a light interference phenomenon. The projector 866 may project light onto a screen so as to display an image. For example, the screen may be arranged in the inside or the outside of the electronic device 801. According to an embodiment, the display 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, or a D-subminiature (D-sub) 878. The interface 870 may be included, for example, in the communication interface 770 illustrated in FIG. 7. Additionally or generally, the interface 870 may include, for example, a mobile high definition link (MHL) interface, a SD card/multi-media card (MMC) interface, or an infrared data association (IrDA) standard interface.

The audio module 880 may convert a sound and an electric signal in dual directions. At least a part of the audio module 880 may be included, for example, in the input/output interface 750 illustrated in FIG. 7. The audio module 880 may process, for example, sound information that is input or output through a speaker 882, a receiver 884, an earphone 886, or the microphone 888.

For example, the camera module 891 may shoot a still image or a video. According to an embodiment, the camera module 891 may include at least one or more image sensors (e.g., a front sensor or a rear sensor), a lens, an image signal processor (ISP), or a flash (e.g., an LED or a xenon lamp).

The power management module 895 may manage, for example, power of the electronic device 801. According to an embodiment, a power management integrated circuit (PMIC), a charger IC, or a battery or fuel gauge may be included in the power management module 895. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 896 and a voltage, current or temperature thereof while the battery is charged. The battery 896 may include, for example, a rechargeable battery and/or a solar battery.

The indicator 897 may display a specific state of the electronic device 801 or a part thereof (e.g., the processor 810), such as a booting state, a message state, a charging state, and the like. The motor 898 may convert an electrical signal into a mechanical vibration and may generate the following effects: vibration, haptic, and the like. Although not illustrated, a processing device (e.g., a GPU) for supporting a mobile TV may be included in the electronic device 801. The processing device for supporting the mobile TV may process media data according to the standards of Digital Multimedia Broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 9:
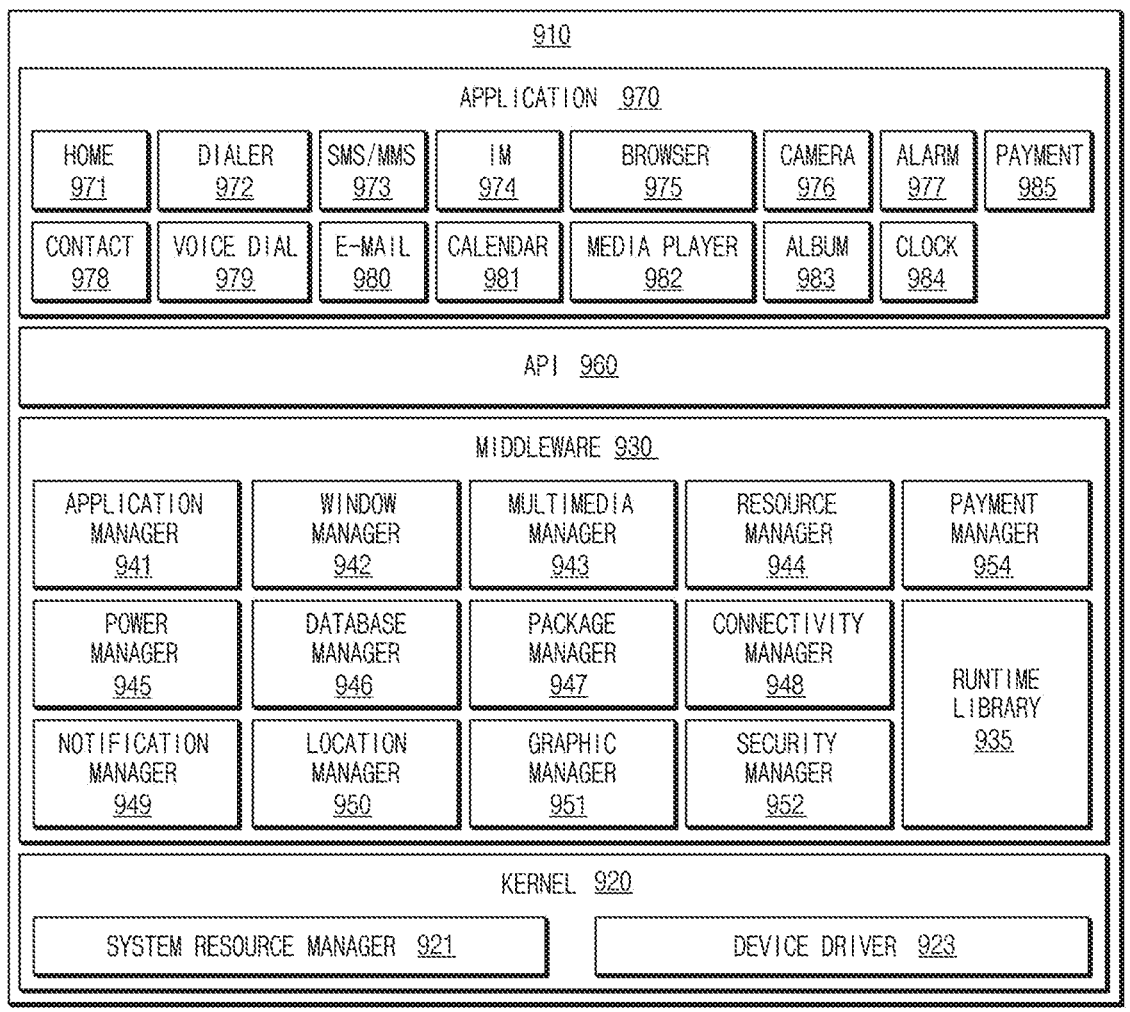
FIG. 9 is a block diagram of a program module according to various embodiments of the present disclosure.

FIG. 9 illustrates a block diagram of a program module, according to various embodiments.

According to an embodiment, a program module 910 (e.g., the program 740) may include an operating system (OS) to control resources associated with an electronic device (e.g., the electronic device 701), and/or diverse applications (e.g., the application program 747) driven on the OS. The OS may be, for example, Android, iOS, Windows, Symbian, or Tizen.

The program module 910 may include a kernel 920, a middleware 930, an application programming interface (API) 960, and/or an application 970. At least a portion of the program module 910 may be preloaded on an electronic device or may be downloadable from an external electronic device (e.g., the first electronic device 702, the second electronic device 704, the server 706, or the like).

The kernel 920 (e.g., the kernel 741) may include, for example, a system resource manager 921 or a device driver 923. The system resource manager 921 may control, allocate, or retrieve system resources. According to an embodiment, the system resource manager 921 may include a process managing unit, a memory managing unit, a file system managing unit, or the like. The device driver 923 may include, for example, a display driver, a camera driver, a Bluetooth driver, a shared memory driver, a USB driver, a keypad driver, a Wi-Fi driver, an audio driver, or an inter-process communication (IPC) driver.

The middleware 930 may provide, for example, a function that the application 970 needs in common, or may provide diverse functions to the application 970 through the API 960 to allow the application 970 to efficiently use limited system resources of the electronic device. According to an embodiment, the middleware 930 (e.g., the middleware 743) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, or a payment manager 954.

The runtime library 935 may include, for example, a library module that is used by a compiler to add a new function through a programming language while the application 970 is being executed. The runtime library 935 may perform input/output management, memory management, or capacities about arithmetic functions.

The application manager 941 may manage, for example, a life cycle of at least one application of the application 970. The window manager 942 may manage a graphic user interface (GUI) resource that is used in a screen. The multimedia manager 943 may identify a format necessary for playing diverse media files, and may perform encoding or decoding of media files by using a codec suitable for the format. The resource manager 944 may manage resources such as a storage space, memory, or source code of at least one application of the application 970.

The power manager 945 may operate, for example, with a basic input/output system (BIOS) to manage capacity of a battery, temperature, or power, and may determine or provide power information for an operation of an electronic device by using the corresponding information from among the pieces of information. The database manager 946 may generate, search for, or modify database that is to be used in at least one application of the application 970. The package manager 947 may install or update an application that is distributed in the form of package file.

The connectivity manager 948 may manage, for example, wireless connection such as Wi-Fi or Bluetooth. The notification manager 949 may display or notify an event such as arrival message, appointment, or proximity notification in a mode that does not disturb a user. The location manager 950 may manage location information about an electronic device. The graphic manager 951 may manage a graphic effect that is provided to a user, or manage a user interface relevant thereto. The security manager 952 may provide a general security function necessary for system security, user authentication, or the like. According to an embodiment, in the case where an electronic device (e.g., the electronic device 701) includes a telephony function, the middleware 930 may further include a telephony manager for managing a voice or video call function of the electronic device.

The middleware 930 may include a middleware module that combines diverse functions of the above-described elements. The middleware 930 may provide a module specialized to each OS kind to provide differentiated functions. Additionally, the middleware 930 may dynamically remove a part of the preexisting elements or may add new elements thereto.

The API 960 (e.g., the API 745) may be, for example, a set of programming functions and may be provided with a configuration that is variable according to an OS. For example, in the case where an OS is the android or the iOS, it may provide one API set per platform. In the case where an OS is the Tizen, it may provide two or more API sets per platform.

The application 970 (e.g., the application program 747) may include, for example, one or more applications capable of providing functions for a home 971, a dialer 972, an SMS/MMS 973, an instant message (IM) 974, a browser 975, a camera 976, an alarm 977, a contact 978, a voice dial 979, an e-mail 980, a calendar 981, a media player 982, an album 983, a timepiece 984, a payment 985, health care (e.g., measuring an exercise quantity, blood sugar, or the like) or offering of environment information (e.g., information of barometric pressure, humidity, temperature, or the like).

According to an embodiment, the application 970 may include an application (hereinafter referred to as "information exchanging application" for descriptive convenience) to support information exchange between an electronic device (e.g., the electronic device 701) and an external electronic device (e.g., the first electronic device 702 or the second electronic device 704). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 970 may include an application (e.g., a health care application of a mobile medical device) that is assigned in accordance with an attribute of an external electronic device. According to an embodiment, the application 970 may include an application that is received from an external electronic device (e.g., the first electronic device 702, the second electronic device 704, or the server 706). According to an embodiment, the application 970 may include a preloaded application or a third party application that is downloadable from a server. The names of elements of the program module 910 according to the embodiment may be modifiable according to kinds of operating systems.

According to various embodiments, at least a portion of the program module 910 may be implemented by software, firmware, hardware, or a combination of two or more thereof. At least a portion of the program module 910 may be implemented (e.g., executed), for example, by the processor (e.g., the processor 810). At least a portion of the program module 910 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 720), may cause the one or more processors to perform a function corresponding to the instruction. The computer-readable storage media, for example, may be the memory 730.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device, comprising:
   a socket where a universal integrated circuit card (UICC) is inserted, the UICC including a first profile installed thereon and pre-activated by a mobile network operator (MNO) server;
   an embedded UICC (eUICC) fixed in the electronic device; and
   a processor configured to be electrically connected with the UICC and the eUICC,
   wherein the processor is configured to:
      identify that a current location of the electronic device corresponds to a country code of a first international mobile station identity (IMSI) included in the first profile,
      transmit, in response to the identifying, a request for a second profile to be installed in the eUICC to the MNO server based on the first profile to allow the MNO server to replace the first profile with the second profile, the request including information of the first profile,
      perform authentication with a second server associated with the MNO server based on information received from a third server that receives a notification regarding the request from the second server,
      receive the second profile from the second server, and install the received second profile in the eUICC,
   wherein the first profile includes a first mobile station subscriber directory number (MSISDN), and
   wherein the second profile includes a second IMSI different from the first ISMI and a second MSISDN identical to the first MSISDN.

2. The electronic device of claim 1, wherein the processor is further configured to:
   enable the second profile of the eUICC, and
   disable the first profile of the UICC.

3. The electronic device of claim 1, wherein the processor is further configured to:
   compare a current location information of the electronic device with the first IMSI of the first profile, and
   transmit the request for the second profile to the MNO server, when the location information corresponds to country information of the first IMSI.

4. The electronic device of claim 1, wherein the processor is further configured to:
   obtain an activation code from the MNO server in response to the request of the second profile, and
   perform the authentication with the second server based on the activation code.

5. The electronic device of claim 4, wherein the activation code includes at least one of a matching ID generated by the second server, an ICCID, an EID of the eUICC, or a URL of the second server.

6. The electronic device of claim 1, wherein the processor is further configured to:
   obtain a URL of the second server from the MNO server in response to the request of the second profile, and
   access the second server according to the obtained URL.

7. The electronic device of claim 1, wherein the processor is further configured to:
   obtain a URL of an SM-DS server from the MNO server in response to the request of the second profile, and
   obtain a URL of the second server through authentication with the SM-DS server.

8. The electronic device of claim 1, wherein the first server is an MNO server, and the second server is an SM-DP+ server.

9. A method for managing a profile in an electronic device having a socket where a universal integrated circuit card (UICC) is inserted, the UICC including a first profile installed thereon, and an embedded UICC (eUICC) fixed in the electronic device, the method comprising:
   identifying that a current location of the electronic device corresponds to a country code of a first international mobile station identity (IMSI) included in the first profile
   transmitting, in response to the identifying, a request for a second profile to be installed in the eUICC to a mobile network operator (MNO) server based on a first profile installed in the UICC to allow the MNO server to replace the first profile with the second profile, the first profile being pre-activated by the MNO server;
   performing authentication with a second server associated with the MNO server based on information received from a third server that receives a notification regarding the request from the second server; and
   receiving the second profile from the second server and installing the received second profile in the eUICC,
   wherein the first profile includes the first IMSI and a first mobile station subscriber directory number (MSISDN), and
   wherein the second profile includes a second IMSI different from the first ISMI and a second MSISDN identical to the first MSISDN.

10. The method of claim 9, further comprising:
enabling the second profile; and
disabling the first profile.

11. The method of claim 9, wherein the transmitting the request includes:
comparing a current location information of the electronic device with the IMSI of the first profile, and
transmitting the request for the second profile to the first server, when the location information corresponds to country information of the first IMSI.

12. The method of claim 9, further comprising:
obtaining a URL of a second server from the MNO server in response to the request of the second profile; and
accessing the second server according to the obtained URL.

* * * * *